(12) United States Patent
Harkness

(10) Patent No.: US 9,093,183 B2
(45) Date of Patent: Jul. 28, 2015

(54) HEAVY RADIAL NEUTRON REFLECTOR FOR PRESSURIZED WATER REACTORS

(71) Applicant: WESTINGHOUSE ELECTRIC COMPANY LLC, Cranberry Township, PA (US)

(72) Inventor: Alexander W. Harkness, Gibsonia, PA (US)

(73) Assignee: Westinghouse Electric Company LLC, Cranberry Township, PA (US)

(*) Notice: Subject to any disclaimer, the term of this patent is extended or adjusted under 35 U.S.C. 154(b) by 556 days.

(21) Appl. No.: 13/721,138

(22) Filed: Dec. 20, 2012

(65) Prior Publication Data

US 2014/0177779 A1     Jun. 26, 2014

(51) Int. Cl.
*G21C 11/06*     (2006.01)
*G21C 5/00*      (2006.01)

(52) U.S. Cl.
CPC  *G21C 11/06* (2013.01); *Y02E 30/40* (2013.01)

(58) Field of Classification Search
CPC ................................ G21C 11/06; G21C 15/10
USPC ......... 376/458, 904; 976/DIG. 159, DIG. 192
See application file for complete search history.

(56) References Cited

U.S. PATENT DOCUMENTS

| | | | | |
|---|---|---|---|---|
| 3,260,650 A | * | 7/1966 | Petersen et al. | ............... 376/458 |
| 3,660,231 A | * | 5/1972 | Fox et al. | ............. 976/DIG. 159 |
| 3,785,924 A | * | 1/1974 | Notari | .................. 976/DIG. 192 |
| 4,731,220 A | * | 3/1988 | Kim | ............................... 376/458 |
| 4,751,043 A | * | 6/1988 | Freeman et al. | ............... 376/458 |
| 4,783,312 A | * | 11/1988 | Gjertsen et al. | ............... 376/458 |
| 4,849,162 A | * | 7/1989 | Garner et al. | .................. 376/458 |
| 4,941,159 A | * | 7/1990 | Schwirian et al. | ............ 376/458 |
| 2009/0225930 A1 | | 9/2009 | Singleton | |
| 2011/0096890 A1 | * | 4/2011 | Balog | ............................ 376/458 |
| 2012/0076254 A1 | | 3/2012 | Malloy et al. | |

FOREIGN PATENT DOCUMENTS

| | | |
|---|---|---|
| JP | 2002323587 A | 11/2002 |
| JP | 2009074960 A | 4/2009 |

OTHER PUBLICATIONS

International Search Report and Written Opinion of the International Searching Authority for PCT/US2013/073222 dated Sep. 16, 2014 (Forms PCT/ISA/220, PCT/ISA/210, PCT/ISA/237).

* cited by examiner

*Primary Examiner* — Jack W Keith
*Assistant Examiner* — Daniel Wasil
(74) *Attorney, Agent, or Firm* — Joseph C. Spadacene; Westinghouse Electric Company LLC

(57) ABSTRACT

A heavy radial neutron reflector for a pressurized water reactor that employs elongated lengths of round bar stock closely packed in either a triangular or rectangular array extending between former plates of a core shroud between the core barrel and the baffle plates which outline the periphery of the reactor core and are formed in axial and circumferential modules. Flow channels are formed in the long gaps between the adjacent round bar stock that communicates cooling water that enters through the core barrel at the top of the shroud and flows down through openings in the former plates to the bottom of the neutron reflector where it exits through a lower baffle orifice to join other cooling water flowing up through the lower core support plate.

20 Claims, 8 Drawing Sheets

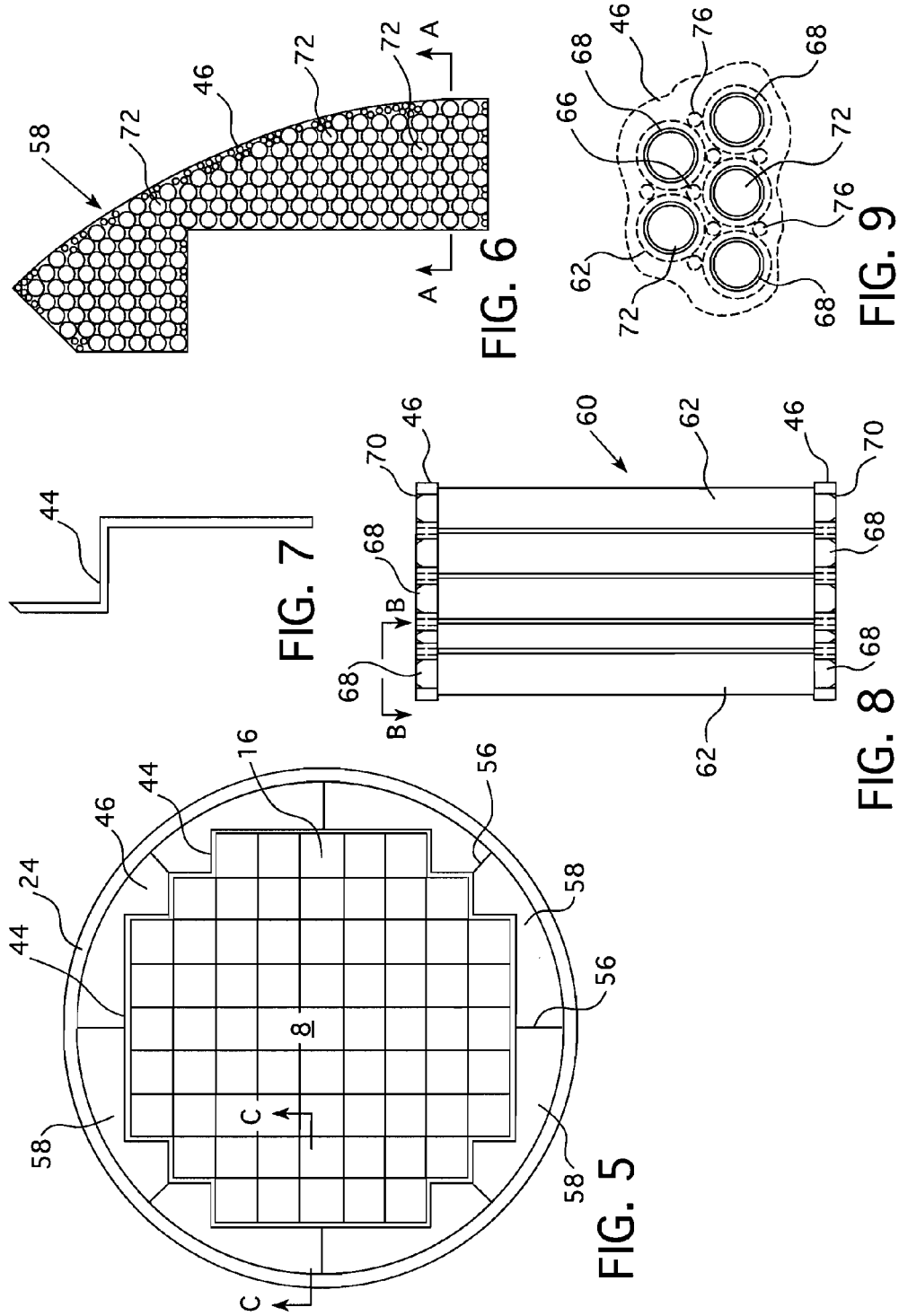

HEAVY RADIAL NEUTRON REFLECTOR FOR PRESSURIZED WATER REACTORS

BACKGROUND

1. Field

This invention relates in general to the field of pressurized light water nuclear reactors and, in particular, to radial neutron reflectors which surround the nuclear core for improved neutron economy to lower fuel costs and reduce the radiation dose on the pressure vessel.

2. Description of Related Art

The fission reactions in a nuclear reactor generate heat and release neutrons which produce additional fission reactions in the nuclear fuel. The fissile material is massed in the reactor such that the neutron flux density is sufficient to maintain a sustained fission process. In a commercial reactor, pellets of the fissile material are encased in Zircoloy rods mounted in modular, elongated fuel assemblies which are generally square in cross section. A large number of these square, elongated fuel assemblies are massed to form a generally cylindrical reactor core which is housed inside the cylindrical stainless steel core barrel between horizontal upper and lower stainless steel core plates. This entire assembly, in turn, is mounted inside a pressure vessel with generally hemispherical upper and lower heads. Reactor coolant, introduced into the pressure vessel through inlet nozzles, flows downward in an annular space between the core barrel and the pressure vessel, reverses direction in the lower plenum of the vessel, flows upward through openings in the lower core plate, and through the fuel assemblies where it is heated as a result of the fission reactions before being directed radially out of the pressure vessel through outlet nozzles. The heat extracted by the reactor coolant from the core is utilized to generate electricity thereby lowering the temperature of the reactor coolant which is recirculated through the reactor in a closed loop.

Since the fuel assemblies are square in cross section, an irregular space exists between the periphery of the core and the round inner surface of the core barrel. The usual practice is to place longitudinally extending flat, baffle plates along the outer surfaces of the fuel assemblies to confine the upward coolant flow to the fuel assemblies. The baffle plates are held in place by horizontal, irregularly shaped former plates that are bolted to and between the longitudinal baffle plates and the core barrel. Holes in the former plates permit limited coolant flow in the generally annular space between the longitudinal baffle plates and the core barrel to provide cooling for these components and to equalize the pressure on both sides of the longitudinal baffle plates.

Although the original purpose of the vertical baffle plates was to channel reactor coolant flow through the fuel assemblies, it has been recognized that to some extent they also reflect neutrons back towards the peripheral fuel assemblies. However, since these plates are relatively thin, most of the neutrons escaping radially from the core migrate into the large volume of water between the baffle plates and the core barrel which absorbs or thermalizes the neutrons with very little reflection.

Radial reflectors are designed to reflect neutron radiation back into the interior active core region of the reactor vessels during power operation to improve the efficiency of the reactors and to protect the reactor vessels from the embrittling affects of years of irradiation during power operation.

With an aging fleet of reactors around the world, there is a current need to extend the life of reactor vessels by more effectively shielding the vessel walls from irradiation to satisfy the requirements for plant licensing extensions. Furthermore, new reactors are being designed with larger and larger cores that will necessitate a more effective shield of the reactor vessel wall to achieve the desired operating life.

Accordingly, it is an object of this invention to provide a radial reflector design that provides improved protection for the reactor vessel walls against radiation that will extend the vessel's life.

It is a further object of this invention to provide a new radial reflector design that can economically be constructed, and preferably back-fitted into existing reactors.

Further, it is an additional object of this invention to provide such a radial reflector design that can accommodate ever larger reactor cores with minimum increases in reactor vessel size.

SUMMARY

These and other objects are achieved by this invention which provides a nuclear reactor having a reactor pressure vessel with a cylindrical core barrel supported within and spaced from an interior of the reactor pressure vessel with the cylindrical core barrel having a central axis substantially co-axially aligned with a central axis of the pressure vessel. A nuclear core comprising a plurality of fuel assemblies forming a fuel assembly array is supported within and spaced from the core barrel. A core shroud is supported between the core barrel and the fuel assembly array having, in part, an outer contour that substantially matches an inner contour of the core barrel, an inner contour that substantially matches an outer contour of the fuel assembly array and a hollow interior portion. A neutron reflector is positioned within the hollow interior portion of the shroud and comprises a closely packed array of elongated rods with an elongated dimension extending in the axial direction.

In one embodiment, the shroud comprises former plates which are attached to and extend from an inner surface of the core barrel, in a tandem, spaced array supported at a plurality of spaced elevations. The shroud also includes baffle plates which extend axially substantially between the former plates. The baffle plates substantially form the inner contour of the shroud. The elongated rods of the neutron reflector extend axially between the former plates, in between the baffle plates and the core barrel and the elongated rods are attached at a first and second end to the former plates. Preferably, the first and second ends of the elongated rods have a reduced diameter relative to a central axial portion of the elongated rods. Desirably, the reduced diameter of the first and second ends fit into openings in the former plates. Preferably, the elongated rods have a substantially round cross section, are closely packed or contacting each adjacent rod along an axial extent around a portion of a circumference of the adjacent rod and are spaced from the adjacent rod along the axial extent around another portion of the circumference of the adjacent rod to form a coolant channel axially along the another portion of the adjacent rod. Preferably, flow holes in the former plates align with the coolant channel and the first and second ends of the elongated rods are attached to the openings in the former plates. Desirably, the first and second ends are welded to the openings in the former plates. In another embodiment the transition between the reduced diameter ends and the central axial portion of at least some of the elongated rods is formed as a bevel and the corresponding flow holes have a larger diameter than the aligned coolant channel.

Preferably, at least some of the elongated rods that extend between some of the former plates at a lower most elevation are axially aligned with other elongated rods which extend between the former plates at elevations above the elongated rods at the lower most elevation. In one embodiment, the aligned elongated rods extend between at least five of the tandemly spaced former plates with an upper former plate immediately above the aligned elongated rods and a lower former plate immediately below the aligned elongated rods having one thickness and a number of the former plates in the tandem array at intermediate elevations having twice the one thickness. In one embodiment the number of former plates at the intermediate elevations comprise two former plates stacked back to back. In still another embodiment the neutron reflector comprises a number of axially stacked elongated rod modules with each module comprising a plurality of elongated rod segments supported at opposing ends by a former plate. In a further embodiment at least some of the elongated rods extend between modules coupling the modules together.

In another embodiment, the elongated rods extend from a lower former plate to an upper former plate wherein the lower former plate is spaced above a lower core support plate on which the fuel assemblies are supported and the upper former plate is spaced from an upper core plate that restrains the fuel assemblies. The space between the upper core plate and the upper former plate forms an upper coolant inlet plenum having an input orifice through the core barrel and the space between the lower core plate and the lower former plate forms a lower coolant outlet plenum having an outlet orifice through a lower portion of a baffle plate so that coolant to cool the reflector enters from the core barrel, through the input orifice, into the upper coolant inlet plenum, passes through the former plates around the elongated rods and into the lower coolant outlet plenum where it passes into the core through the outlet orifice.

Alternately, the flow along the elongated rods can be reversed resulting in an up-flow condition. In this latter arrangement flow enters the lower plenum between the lower former plate and the lower core support plate, at the bottom of the core, passes through the former plates around the elongated rods and into the upper coolant plenum where it exits the reflector and rejoins the main coolant flow path at the core exit.

In one embodiment, the elongated rods are supported on a triangular pitch. In an alternate embodiment, the elongated rods are supported on a rectangular pitch. Desirably, the former plates are formed in a number of sections, for example eight sections, extending circumferentially around the circumference of the core.

BRIEF DESCRIPTION OF THE DRAWINGS

A further understanding of the invention can be gained from the following description of the preferred embodiments when read in conjunction with the accompanying drawings in which:

FIG. 5 is a plan view of a baffle and former arrangement that incorporates the heavy reflector of one embodiment of this invention;

FIG. 6 is a sectional view through the elongated rods showing a segment of one of the former plates of the core shroud incorporating the heavy reflector of one embodiment of this invention;

FIG. 7 is a plan view of a core baffle plate which axially extends from the former plate shown in FIG. 6;

FIG. 8 is a sectional view of the core shroud taken along the lines A-A of FIG. 6;

FIG. 9 is a sectional view of the core shroud taken along the lines B-B of FIG. 8;

DESCRIPTION OF THE PREFERRED EMBODIMENT

Figure 1:
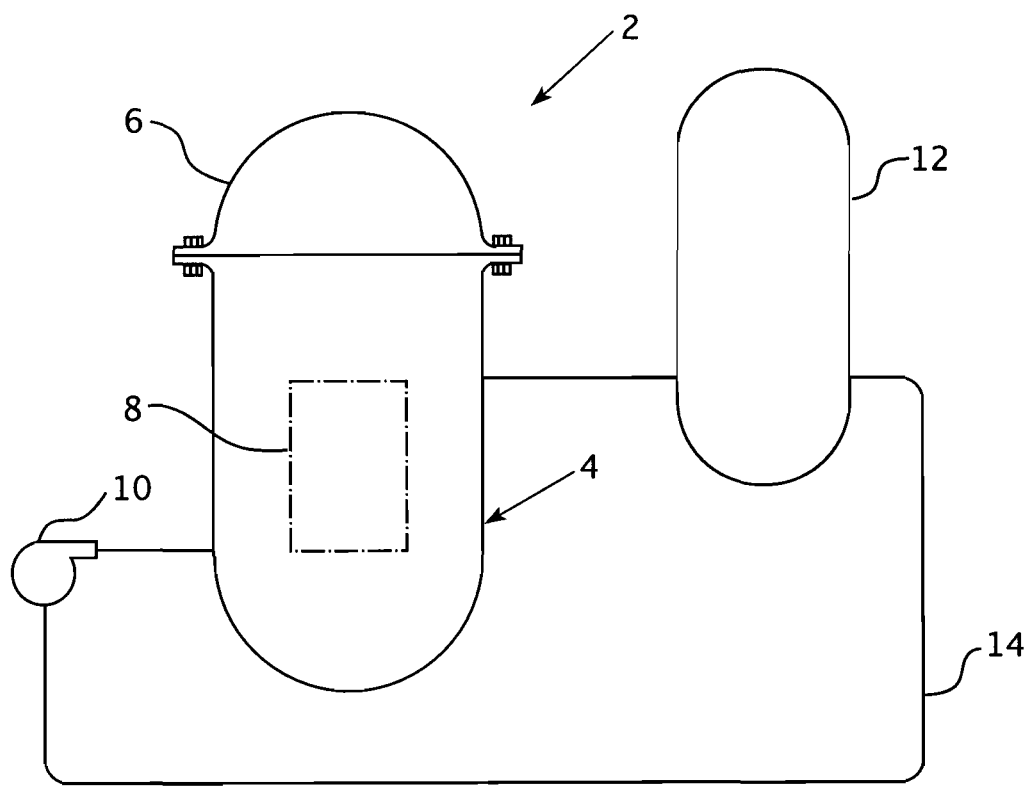
FIG. 1 is a simplified schematic of a nuclear reactor system to which this invention may be applied.

Referring now to the drawings, FIG. 1 shows a simplified nuclear reactor primary system 2, including a generally cylindrical reactor pressure vessel 4 having a closure head 6 enclosing a nuclear core 8. A liquid reactor coolant, such as water, is pumped into the vessel 4 by the pump 10 through the core 8 where heat energy is absorbed and is discharged to a heat exchanger 12 typically referred to as a steam generator, in which heat is transferred to a utilization circuit (not shown) such as a steam driven turbine generator. The reactor coolant is then returned to the pump 10 completing the primary loop. Typically, a plurality of the above described loops are connected to a single reactor vessel 4 by the reactor coolant piping 14.

Figure 2:
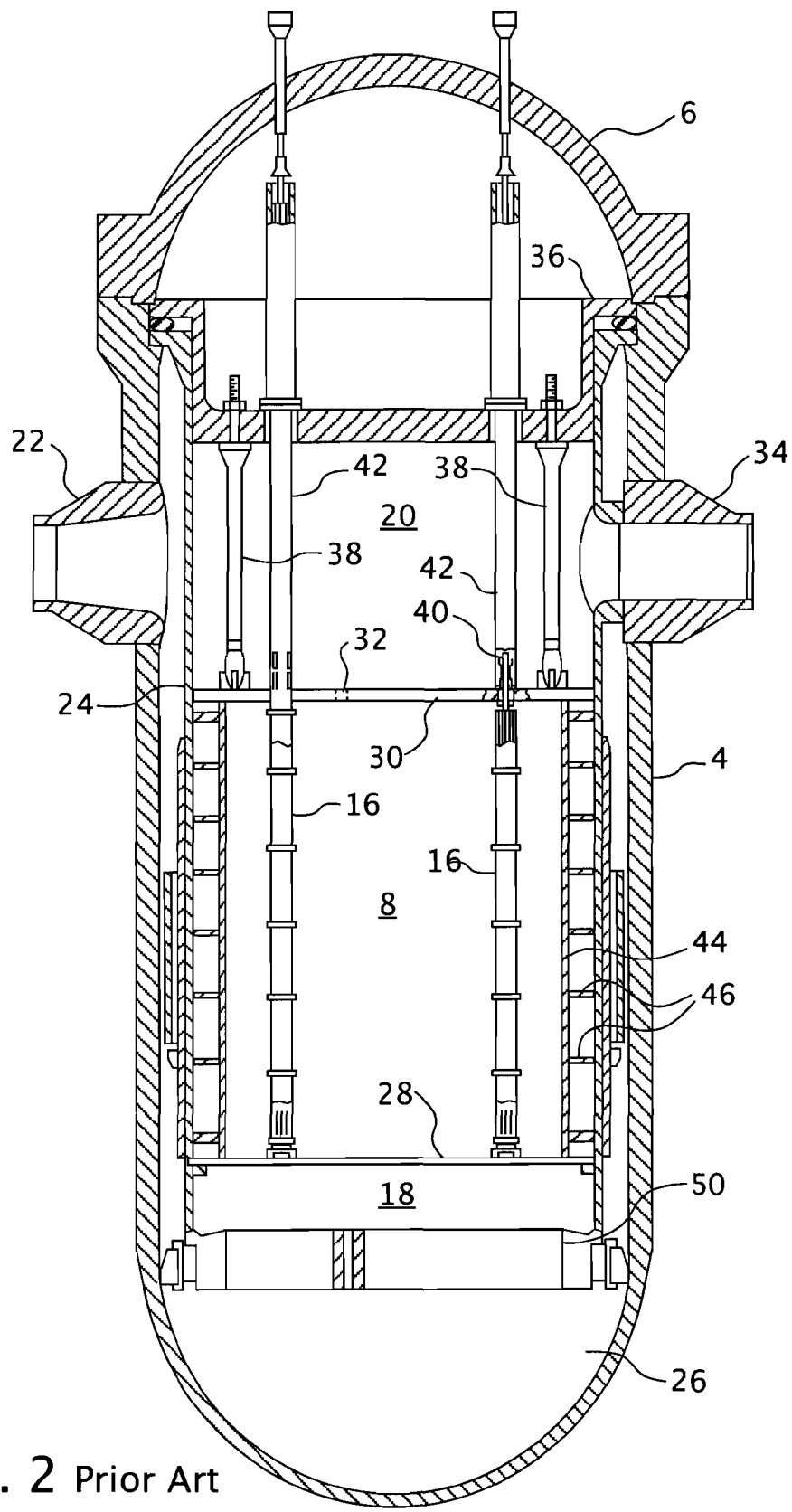
FIG. 2 is an elevational view, partially in section, of a nuclear reactor vessel and internal components of typical pressurized water reactor.
Figure 3:
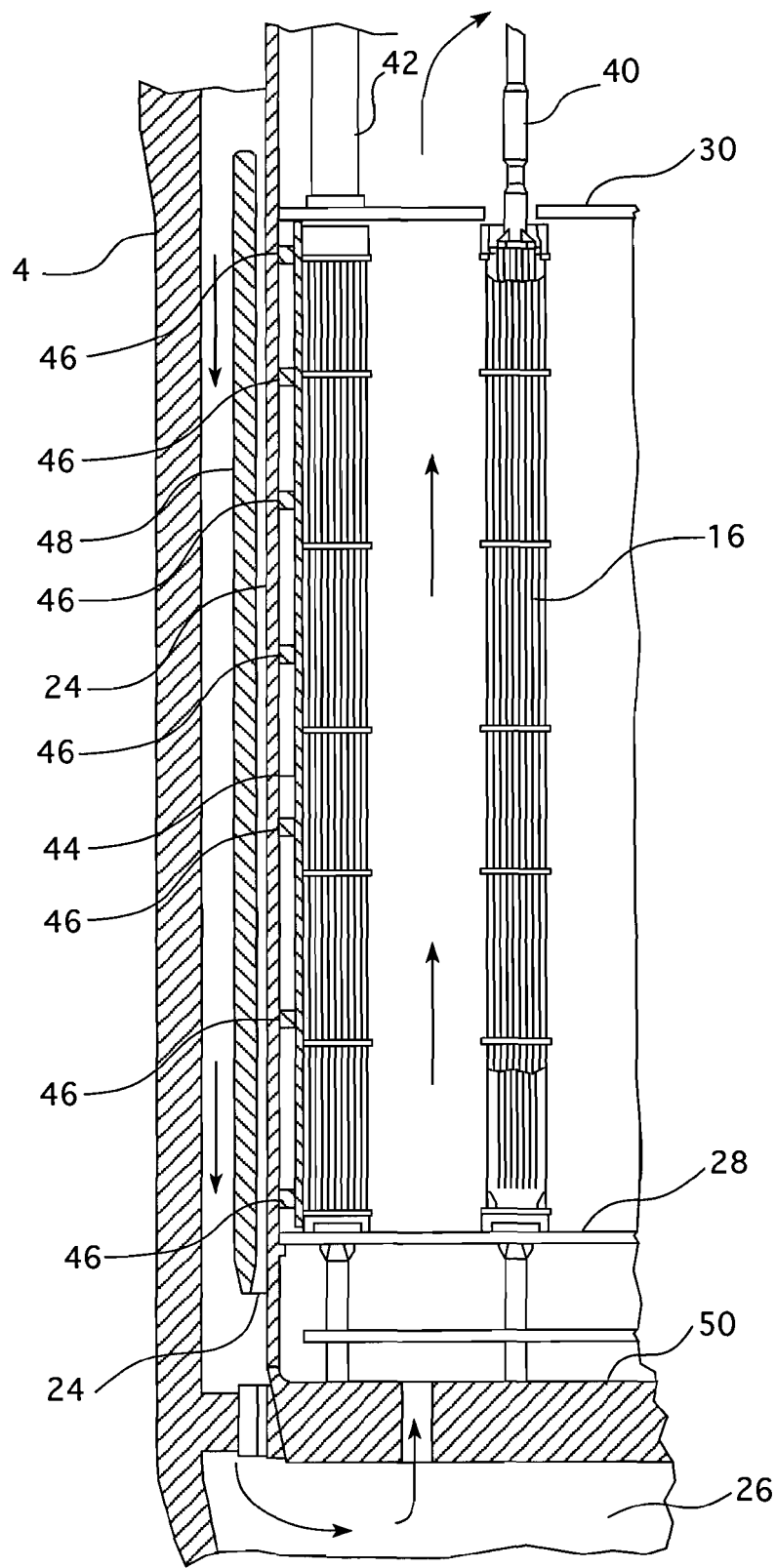
FIG. 3 is an enlarged elevational view of a portion of the lower internals of a prior art pressurized water reactor showing a portion of the core, internals and pressure vessel.
Figure 4:
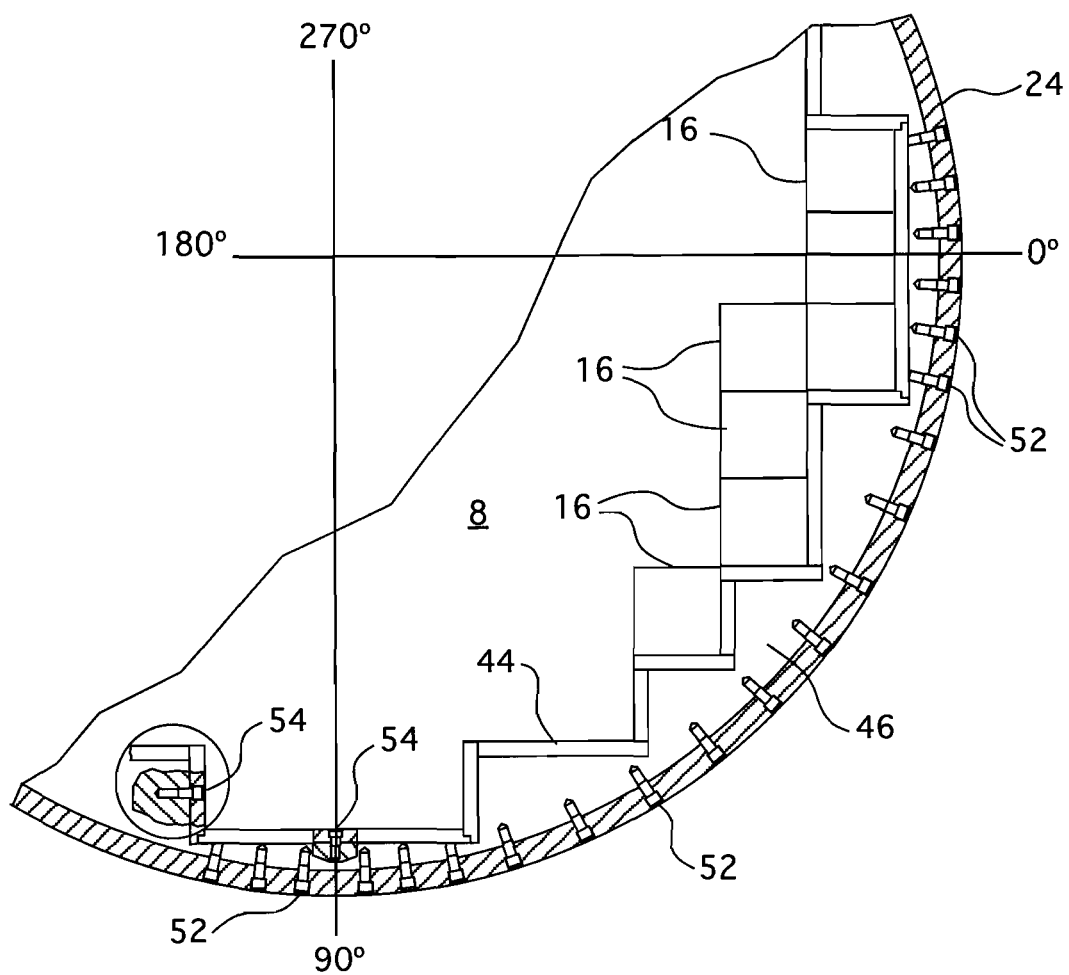
FIG. 4 is a partial plan view of a prior art baffle and former arrangement.

A conventional reactor design is shown in more detail in FIGS. 2, 3 and 4. In addition to the core 8 comprised of a plurality of parallel, vertically co-extending fuel assemblies 16, for purposes of this description, the other internal structures can be divided into the lower internals 18 and the upper internals 20. In conventional designs, the lower internals function to support, align and guide core components and instrumentation, as well as to direct flow within the vessel. The upper internals restrain or provide a secondary restraint for the fuel assemblies 16 (only two of which are shown for simplicity in FIGS. 2 and 3), and support and guide instrumentation and components such as control rods.

In the exemplary reactors shown in FIGS. 2 and 3, coolant enters the vessel 4 through one or more inlet nozzles 22, flows downward about a core barrel 24, is turned 180° in a lower plenum 26, passes upwardly through a lower support plate 50 then a lower core plate 28 upon which the fuel assemblies 16 are seated, and through and about the assemblies. The coolant flow through the core and surrounding area is typically large, in the order of 400,000 gallons per minute (25.24 meters$^3$/second) at a velocity of approximately 20 feet per second (6.1 meters per second). The resulting pressure drop and frictional forces tend to cause the fuel assemblies 16 to rise, which arrangement is restrained by the upper internals 20, including a circular upper core plate 30. Coolant exiting the core 8 flows along the underside of the upper core plate 30 and upwardly through a plurality of perforations 32. The coolant then flows upwardly and radially to one or more outlet nozzles 34.

The upper internals 20 can be supported from the reactor vessel 4 or vessel head 6 and include an upper support assembly 36. Loads are transmitted between the upper support assembly 36 and the upper core plate 30 primarily by a plurality of support columns 38. A support column is aligned above a selected fuel assembly 16 and perforations 32 in the upper core plate.

Rectilinearly moveable control rods typically include a drive shaft 40 and a spider assembly of neutron absorbing rods which are guided through the upper internals 20 and into aligned fuel assemblies 16 by the control rod guide tubes 42. The guide tubes 42 are fixedly joined to the upper support assembly 36 and connected by a split pin force fit into the top of the upper core plate 30.

Currently, the core 8 is typically enclosed by a series of vertical baffle plates 44 attached to horizontal former plates 46 that are connected between the baffle plates 44 and the reactor vessel core barrel 24 as can be seen in FIGS. 2 and 3, though there is a slight difference in the number of former plates shown between the two figures, which is, in part dependent upon the height of the core. FIG. 3 depicts an elevational view of a typical pressure vessel 4 enclosing the baffle/former/fuel assembly elements 44, 46, 16 and also showing the upper core plate 30, lower core support plate 28, cylindrical thermal shield 48 and lower support plate 50.

FIG. 4 illustrates a partial plan view that provides a better appreciation of the baffle plates 44, former plates 46 and fasteners 54 and 52, which, respectively, attach the baffle plates to the former plates and the former plates to the core barrel. In convention designs, such as are illustrated in FIGS. 2 and 3, there are typically between 7 and 8 levels of former plates 46. A typical threaded hole receives a threaded fastener 52 which affixes the former plates 46 to the core barrel 24. As can be seen in FIG. 4, the perimeter of the core 8 is a stepped (staircase) pattern, which is the classic design and will continue to be the "core enclosure geometry" in newly designed pressurized water reactors, as radial core reflector designs replace the classical standard baffle/former/thermal shield concept to accommodate larger cores that enhance operating life for the plant. This invention provides both (i) a segmented core reflector design that combines with the conventional/baffle/former design to provide a complete core enclosure, and (ii) a full core heavy reflector design with reduced manufacturing costs.

Previous heavy reflector designs have required several large forgings to be gun drilled with several thousands of cooling holes. This invention provides a heavy radial neutron reflector design for pressurized water reactors that will significantly reduce the costs associated with fabrication. In accordance with the inventions claimed hereafter, the required geometry of the reflectors is achieved using only bar and plate stock materials which are welded together. The invention arranges lengths of round bar stock in either a triangular or rectangular array to achieve the metal density necessary for the efficient reflection of neutrons back into the core. The channels that are naturally formed between the closely packed round bars in the array are used to provide the necessary cooling.

Figure 10:
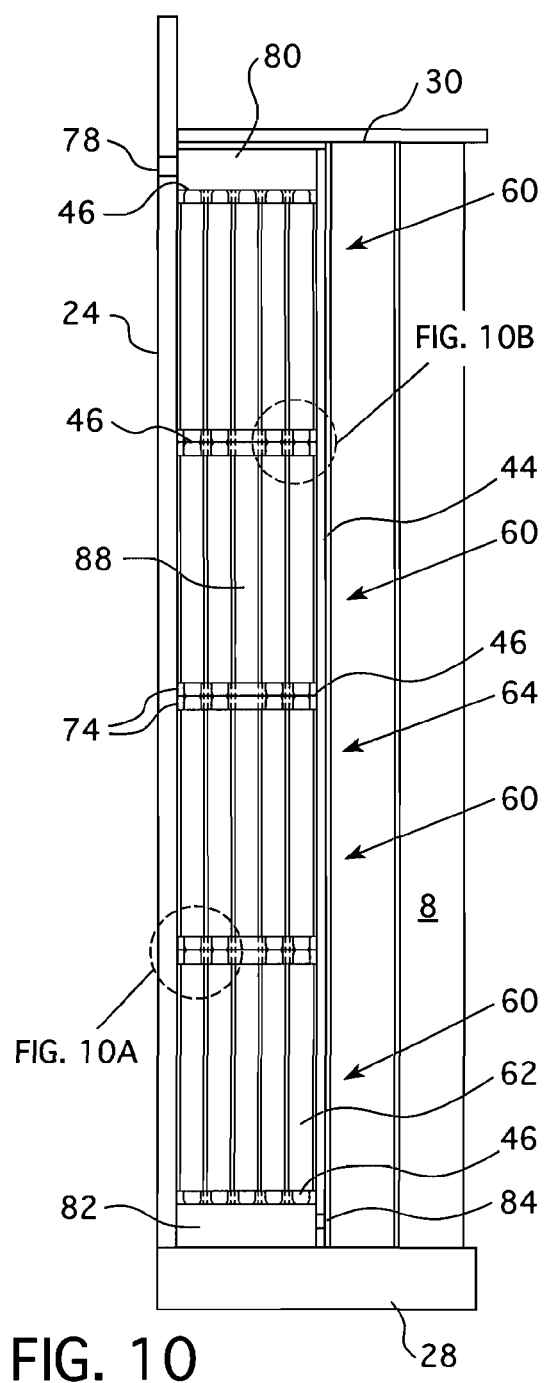
FIG. 10 is a sectional view of the core shroud taken along the lines C-C of FIG. 5.

FIG. 5 is a plan view of a core incorporating the concepts claimed hereafter. The formers 46 are arranged in segments 58 around the core 8 with each former segment 58 separated by the seams 56. The former segments 58 form a part of a corresponding reflector segment 64 (shown in FIG. 10) with each of the reflector segments 64 formed from a tandem array of reflector modules 60 as shown in FIGS. 6, 8 and 10. Each reflector module 60 comprises a number of closely packed elongated rods 62 that are fastened at their opposing ends to former plates 46 as shown in FIG. 8. The modules are then stacked in tandem as shown in FIG. 10 to form a circumferential reflector segment 64. FIG. 8 is a cross section of FIG. 6 taken along the lines A-A thereof.

Figure 11:
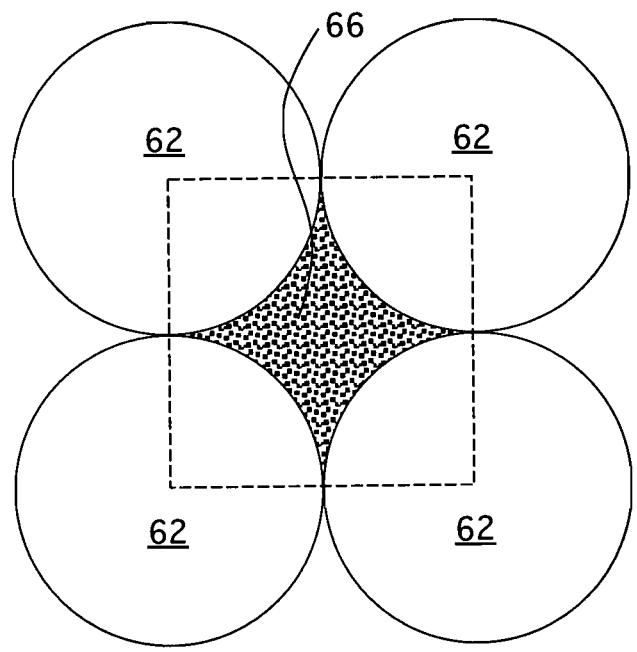
FIG. 11 is a plan view of one embodiment of the elongated reflector rods of this invention supported in a rectangular pitch.
Figure 12:
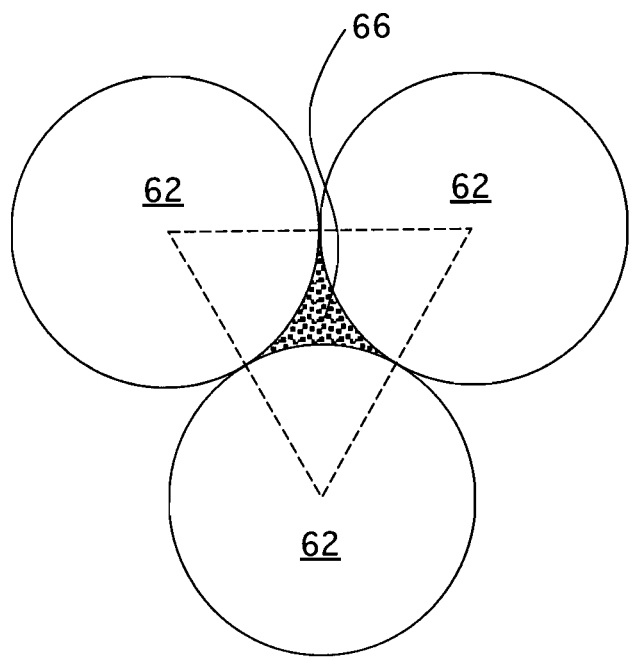
FIG. 12 is a plan view of the elongated reflector rods of a second embodiment of this invention supported in a triangular pitch.

The closely spaced array of elongated round rods 62 may be of various diameters and spacing to achieve the correct level of reflectance and cooling, which will be dependent upon the size of the core. Preferably, the round rods 62 are closely spaced to form natural cooling channels between adjacent rods and can be arranged on either a triangular pitch as illustrated in FIG. 12 or a rectangular pitch as illustrated in FIG. 11. The gaps between rods forming the cooling channels are represented by reference character 66 in FIGS. 9, 11 and 12.

Each length of bar stock which forms the elongated rods 62 is turned down to a smaller diameter at each end of the elongated rods 62 allowing the bars to be placed close enough together to form cooling channels while leaving enough former plate 46 material for a structural weld 70 between the two components, i.e., the former plate and the elongated rod. The former plates are machined from plate stock to fit in the gap formed between the fuel and the core barrel and the bar stock and plate stock are desirably constructed from stainless steel. The intermediary former plates 74 are made up of smaller plates welded together in which the holes 72 are drilled to accept the turndown ends 68 of the elongated round rods 62 extending from either side of the intermediary former plates 74. A weld 70 is made between the former plates 46 and the round rods 62. The weld between the former plates 46 and the round rods 62 is accessible from the back side of the former plates. The former plates 46 also have holes 76 drilled through to line up with the cooling channels 66 formed by adjacent bars 62 to allow primary coolant to flow across the former plates. The holes 76 in the former plates 46 can be enlarged to reduce the resistance to coolant flow if the rods 62 are provided with a bevel 86 between their central axial section and the turned down ends 68 as shown in FIG. 10B.

As can be seen in FIG. 10, an inlet opening 78 is drilled in the core barrel and communicates the incoming reactor coolant flowing outside the core barrel into an inlet plenum 80 between the upper core plate 30 and the top former plate 46. The coolant is then turned in the plenum and directed downward through the former plate cooling holes 76 and the cooling channel gaps 66. The coolant exits the reflector segment 64 at a lower plenum 82 between a bottom former plate 46 and the lower core support plate 28. The coolant exits through a baffle flow hole 84 into the core 8 where the coolant exiting the reflector segment 64 joins with other coolant flowing upward through the lower core support plate 28, to flow up through the core.

Figure 10A:
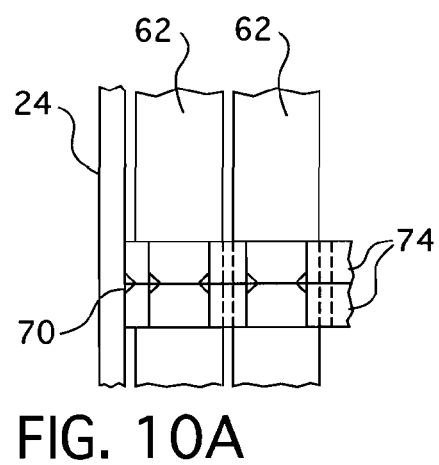
FIGS. 10A and 10B show enlarged portions of FIG. 10 around the interior connections respectively between the core barrel and the former plates and between the former plates and the baffle plates.
Figure 10B:
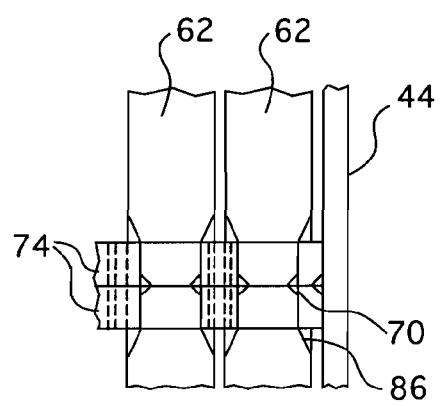
Figure 10C:
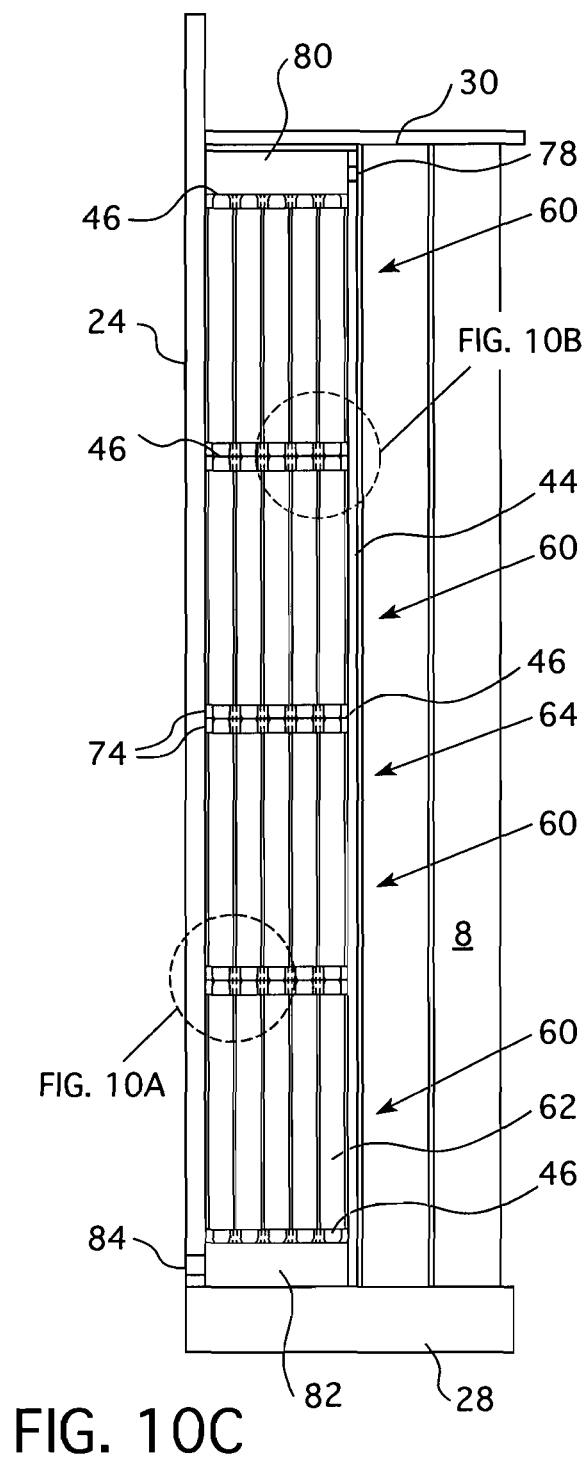
FIG. 10C is a sectional view of an alternate embodiment to the sectional view of the core shroud shown in FIG. 10.

In the alternative embodiment illustrated in FIG. 10C the flow along the elongated rods 62 can be reversed over that shown in FIG. 10, resulting in an up-flow condition wherein flow enters the lower plenum 82 at the bottom of the core through an inlet 84 through the core barrel (or alternately through the opposing baffle plate) and rejoins the main coolant flow path through an exit port 78 at the core exit.

As shown in FIGS. 10A and 10B, structural welds 70 are formed between the former plates 46 and the baffle plates 44. Structural welds 70 are also formed between the top former plate of one reflector module level and the bottom former plate of the next reflector module level. Alternately, the former plates may be attached to the core barrel and baffle plates using threaded fasteners as is shown in FIG. 4. As another alternative, the intermediate former plates 46 may be attached to the adjoining former plate by a select number of full length rods 88 which are attached to the top and bottom former plates such as by welding.

The triangular pitch illustrated in FIG. 12 provides a water to steel area ratio of approximately 9.3% while the rectangular pitch shown in FIG. 11 provides a water to steel ratio of approximately 21.5%, with elongated rods of approximately the same diameter. As previously mentioned, the width of the rods may vary to accommodate the size of the core and the amount of water cooling that will be necessary to compensate for gamma heating. Thus, this invention obviates the need for solid forged plates as thick as 30 inches that are machined to fit the gap between the fuel and core barrel and are drilled with thousands of cooling holes. Accordingly, an effective reflector is provided at a much lower cost.

While specific embodiments of the invention have been described in detail, it will be appreciated by those skilled in the art that various modifications and alternatives to those details could be developed in light of the overall teachings of the disclosure. Accordingly, the particular embodiments disclosed are meant to be illustrative only and not limiting as to the scope of the invention which is to be given the full breadth of the appended claims and any and all equivalents thereof.

What is claimed is:

1. A nuclear reactor comprising:
   a reactor pressure vessel;
   a cylindrical core barrel supported within and spaced from an interior of the reactor pressure vessel and having a central axis substantially coaxially aligned with a central axis of the pressure vessel;
   a nuclear core comprising a plurality of fuel assemblies forming a fuel assembly array is supported between a lower core plate and an upper core plate, within and spaced from the core barrel;
   a shroud is supported between the core barrel and the fuel assembly array, having in part an outer contour that substantially matches an inner contour of the core barrel and an inner contour that substantially matches an outer contour of the fuel assembly array and a hollow interior portion;
   a neutron reflector positioned within the hollow interior portion of the shroud comprising a closely packed array of elongated rods with an elongated dimension extending in the axial direction and;
   wherein the shroud comprises former plates which extend from an inner surface of the core barrel, in a substantially tandem, parallel array at a plurality of spaced elevations and baffle plates which extend axially between the spaced elevations of the former plates and substantially form the inner contour of the shroud, wherein the elongated rods of the neutron reflector extend axially between the former plates and in between the baffle plates and the core barrel and a number of the former plates at an intermediate elevation comprise two former plates stacked back to back.

2. The nuclear reactor of claim 1 wherein the elongated rods are attached at a first and second end to radially adjacent ones of the elongated rods by the former plates.

3. The nuclear reactor of claim 2 wherein the first and second ends of the elongated rods have a reduced diameter relative to a central axial portion of the elongated rods.

4. The nuclear reactor of claim 3 wherein the reduced diameter of the first and second ends of the elongated rods respectively fit into a corresponding openings in the former plates.

5. The nuclear reactor of claim 4 wherein the elongated rods have a substantially round cross-section and are closely packed to contact each of an adjacent rod along an axial extent around a portion of a circumference of the adjacent rod and to be spaced from the adjacent rod around another portion of the circumference of the adjacent rod to form a coolant channel axially along the another portion of the adjacent rod.

6. The nuclear reactor of claim 5 including flow holes in the former plates that align with the coolant channel.

7. The nuclear reactor of claim 6 wherein a transition between the first and second ends and a central portion of at least some of the elongated rods is formed as a bevel and the diameter of at least some of the flow holes in the former plates adjacent the at least some of the elongated rods with the bevel is larger than the narrowest diameter of the corresponding coolant channels.

8. The nuclear reactor of claim 4 wherein the first and second ends of the elongated rods are respectively attached to the former plates at an edge of the corresponding openings in the former plates.

9. The nuclear reactor of claim 8 wherein the first and second ends of the elongated rods are welded to the former plates at the edge of the corresponding openings in the former plates.

10. The nuclear reactor of claim 8 wherein at least some of the elongated rods at a lower most elevation that extend between some of the former plates are axially aligned with other elongated rods which extend between the former plates at elevations above the elongated rods at the lower most elevation.

11. The nuclear reactor of claim 10 wherein the aligned elongated rods extend between at least five of the tandemly spaced former plates with an upper former plate immediately above the aligned elongated rods and a lower former plate immediately below the aligned elongated rods having one thickness and the number of the former plates in the tandem array at the intermediate elevations that are stacked back to back have a combined thickness of approximately twice the one thickness.

12. The nuclear reactor of claim 1 wherein the neutron reflector comprises a number of axially stacked elongated rod modules with each module comprising a plurality of elongated rod segments supported at opposing ends by a former plate.

13. The nuclear reactor of claim 2 wherein the elongated rods between adjacent former plates form a separable neutron reflector module.

14. The nuclear reactor of claim 1 wherein the elongated rods extend from a lower former plate to an upper former plate wherein the lower former plate is spaced above the lower core support plate on which the fuel assemblies are supported and the upper former plate is spaced from the upper core plate that restrains the fuel assemblies, with the space between the upper core plate and the upper former plate forming an upper coolant plenum having a first orifice in fluid communication with one of either a reactor coolant path on route to traversing the core or a reactor coolant path exiting the reactor core and the space between the lower core support plate and the lower former plate forming a lower coolant plenum having a second orifice in fluid communication with the other of the reactor coolant path on route to traversing the core or the reactor coolant path exiting the reactor core, so that coolant to cool the reflector enters from one of the upper coolant plenum or the lower coolant plenum, passes through the former plates around the elongated rods and into the other of the upper coolant plenum or the lower coolant plenum and exits to rejoin a main coolant flow path.

15. The nuclear reactor of claim 1 wherein the elongated rods are supported on a triangular pitch.

16. The nuclear reactor of claim 1 wherein the elongated rods are supported on a rectangular pitch.

17. The nuclear reactor of claim 1 wherein the former plates are formed in a plurality of circumferential sections extending around the circumference of the core.

18. The nuclear reactor of claim 17 wherein the former plates are formed in at least eight circumferential sections.

19. The nuclear reactor of claim 1 wherein at least some of the elongated rods extend in a continuous extent between a very top and a very bottom former plate.

20. The nuclear reactor of claim 19 wherein not all of the elongated rods extend in the continuous extent between the very top and the very bottom former plates.

* * * * *